United States Patent
Isfeldt

(10) Patent No.: US 10,135,290 B2
(45) Date of Patent: *Nov. 20, 2018

(54) INDUCTIVE POWER FOR SEISMIC SENSOR NODE

(71) Applicant: Seabed Geosolutions B.V., Leidschendam (NL)

(72) Inventor: Bjarne Isfeldt, Mathopen (NO)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,306

(22) Filed: Jan. 19, 2017

(65) Prior Publication Data

US 2017/0133875 A1    May 11, 2017

Related U.S. Application Data

(63) Continuation of application No. 14/340,338, filed on Jul. 24, 2014, now Pat. No. 9,595,833.

(51) Int. Cl.
*H02J 7/00* (2006.01)
*H02J 7/02* (2016.01)
(Continued)

(52) U.S. Cl.
CPC ............ *H02J 7/025* (2013.01); *G01V 1/186* (2013.01); *G01V 1/38* (2013.01); *H01F 38/14* (2013.01);
(Continued)

(58) Field of Classification Search
CPC ............ H02J 7/025; H02J 5/005; G01V 1/38
(Continued)

(56) References Cited

U.S. PATENT DOCUMENTS 4,375,089 A * 2/1983 Thigpen ............... G01V 1/3835
                                                   367/106
5,044,461 A * 9/1991 Aronstam ............... G01V 1/184
                                                   175/50
(Continued)

FOREIGN PATENT DOCUMENTS

EP      2853927 A2    1/2015
JP      2014039437    2/2014
(Continued)

OTHER PUBLICATIONS

Singh, Hanumant et al, "An Intelligent Dock for an Autonomous Ocean Sampling Network", Oceans '98 Conference Proceedings, Year: 1998, vol. 3, pp. 1459-1462 vol. 3, DOI: 10.1109/OCEANS.1998.726312.
(Continued)

*Primary Examiner* — M'Baye Diao
(74) *Attorney, Agent, or Firm* — Park, Vaughan, Fleming & Dowler LLP; Shane Nelson

(57) ABSTRACT

Embodiments of systems and methods for inductively powering seismic sensor nodes are presented. An embodiment of an inductive battery includes a battery cell configured to store charge for use by an external device. The inductive battery may also include a first inductive element coupled to the battery cell, the first inductive element configured to receive current from the battery cell and emit a responsive magnetic field for powering an external device through inductance. In an embodiment the external device is a seismic sensor node.

22 Claims, 10 Drawing Sheets

(51) Int. Cl.

| | |
|---|---|
| *G01V 1/38* | (2006.01) |
| *H01M 10/42* | (2006.01) |
| *H01M 10/46* | (2006.01) |
| *H01F 38/14* | (2006.01) |
| *H04B 5/00* | (2006.01) |
| *H02J 50/10* | (2016.01) |
| *H02J 50/80* | (2016.01) |
| *G01V 1/18* | (2006.01) |
| *H01M 2/10* | (2006.01) |
| *G01V 1/16* | (2006.01) |

(52) U.S. Cl.
CPC ......... *H01M 10/425* (2013.01); *H01M 10/46* (2013.01); *H02J 7/0004* (2013.01); *H02J 50/10* (2016.02); *H02J 50/80* (2016.02); *H04B 5/0037* (2013.01); *G01V 1/162* (2013.01); *H01M 2/1055* (2013.01); *H01M 2010/4271* (2013.01); *H01M 2010/4278* (2013.01); *H02J 2007/0098* (2013.01)

(58) Field of Classification Search
USPC ........................................................ 320/108
See application file for complete search history.

(56) References Cited

U.S. PATENT DOCUMENTS

| | | | |
|---|---|---|---|
| 5,949,214 A | 9/1999 | Broussard | |
| 6,662,742 B2 | 12/2003 | Shelton | |
| 6,951,138 B1 | 10/2005 | Jones | |
| 7,037,038 B1* | 5/2006 | Haski | B63B 35/32 210/242.1 |
| 7,042,196 B2* | 5/2006 | Ka-Lai | H01F 38/14 320/108 |
| 7,077,072 B2 | 7/2006 | Wingett | |
| 7,453,768 B2* | 11/2008 | Hall | G01V 1/40 340/853.1 |
| 7,646,670 B2* | 1/2010 | Maxwell | G01V 1/16 181/122 |
| 7,668,044 B2 | 2/2010 | Brinkman | |
| 7,706,771 B2 | 4/2010 | Rofougaran | |
| 7,796,466 B2 | 9/2010 | Combee et al. | |
| 7,804,737 B2 | 9/2010 | Thompson | |
| 7,869,444 B2 | 1/2011 | Menard | |
| 7,883,292 B2 | 2/2011 | Thompson | |
| 8,004,933 B2 | 8/2011 | Iseli | |
| 8,050,140 B2 | 11/2011 | Ray | |
| 8,111,143 B2* | 2/2012 | Tong | H04Q 9/00 340/1.1 |
| 8,407,008 B2 | 3/2013 | Pavel | |
| 8,427,900 B2 | 4/2013 | Fleure | |
| 8,593,105 B2 | 11/2013 | Baarman | |
| 8,599,862 B2 | 12/2013 | Pennec | |
| 8,681,581 B2* | 3/2014 | Moldoveanu | G01V 1/3808 367/15 |
| 8,907,752 B2* | 12/2014 | Wodrich | G06F 1/1635 335/219 |
| 9,013,953 B2* | 4/2015 | Brizard | G01V 1/3843 367/15 |
| 9,071,085 B2* | 6/2015 | Kim | H02J 17/00 |
| 9,301,258 B2* | 3/2016 | Preusser | H04W 52/0261 |
| 9,544,023 B2* | 1/2017 | Tzonev | H04B 5/0037 |
| 9,753,174 B2 | 9/2017 | Maxwell | |
| 9,829,589 B2 | 11/2017 | Ray et al. | |
| 2004/0025268 A1* | 2/2004 | Porat | E04H 4/1654 15/1.7 |
| 2004/0059392 A1* | 3/2004 | Parramon | A61N 1/3605 607/36 |
| 2005/0127868 A1* | 6/2005 | Calhoon | G06F 1/26 320/108 |
| 2005/0162125 A1 | 7/2005 | Yu | |
| 2006/0145659 A1* | 7/2006 | Patino | H01M 10/4257 320/108 |
| 2008/0080318 A1* | 4/2008 | Maxwell | G01V 1/16 367/131 |
| 2008/0137484 A1* | 6/2008 | Scott | G01V 1/184 367/188 |
| 2008/0144442 A1 | 6/2008 | Combee et al. | |
| 2010/0156193 A1* | 6/2010 | Rhodes | G06F 1/1632 307/104 |
| 2011/0241608 A1* | 10/2011 | Adamczyk | H02J 7/025 320/108 |
| 2011/0241617 A1* | 10/2011 | Hoffman | H01M 10/46 320/108 |
| 2012/0163121 A1* | 6/2012 | Hardage | G01V 1/286 367/21 |
| 2012/0187897 A1* | 7/2012 | Lenk | H01M 10/44 320/101 |
| 2013/0325191 A1* | 12/2013 | Mukai | G05B 13/02 700/276 |
| 2014/0198607 A1 | 7/2014 | Etienne | |
| 2014/0211589 A1* | 7/2014 | Maxwell | G01V 1/18 367/15 |
| 2014/0253031 A1* | 9/2014 | Duge | H02J 17/00 320/108 |
| 2014/0254315 A1* | 9/2014 | Rigsby | G01V 1/3808 367/15 |
| 2014/0301161 A1 | 10/2014 | Brizard | |
| 2014/0310433 A1 | 10/2014 | Preusser | |
| 2015/0003194 A1 | 1/2015 | Brizard | |
| 2015/0043308 A1 | 2/2015 | Maas | |
| 2015/0061581 A1* | 3/2015 | Ben-Shalom | H01F 38/14 320/108 |
| 2015/0084783 A1 | 3/2015 | Maxwell | |
| 2015/0316675 A1 | 11/2015 | Brizard | |
| 2015/0331126 A1* | 11/2015 | Lambert | G01V 1/3808 367/15 |
| 2016/0001136 A1* | 1/2016 | King | A63B 69/0071 320/108 |

FOREIGN PATENT DOCUMENTS

| | | |
|---|---|---|
| WO | 2007090168 | 8/2007 |
| WO | 2011139159 | 11/2011 |
| WO | 2013136330 | 9/2013 |
| WO | 2013188903 | 12/2013 |

OTHER PUBLICATIONS

Cranford, A Direct-Recording Ocean-Bottom Seismograph, Bulletin of the Seismological Society of America, vol. 56, No. 2, 607-615 (Apr. 1976) ("Cranford").

Mattaboni, MITOBs: A Seismometer System for Ocean-Bottom Earthquake Studies, Marine Geophysical Researches 3 (1977), pp. 87-102 ("Mattaboni").

http://www.carrack.co.uk/minidobs.htm ("Carrack"), Carrack Measurement Technology, downloaded Jun. 20, 2017.

Willoughby, A Microprocessor-Based Ocean-Bottom Seismometer, Bulletin of the Seismological Society of America vol. 83, No. 1., 190-217 (Feb. 1993) ("Willoughby")

Prothero, First Noise and Teleseismic Recordings on a New Ocean Bottom Seismometer Capsule, Bulletin of the Seismological Society of America, vol. 74, No. 1, 1043-1058 (Jun. 1984) ("Prothero").

Johnson, A Free-Fall Direct-Recording Ocean Bottom Seismograph, Marine Geophysical Researches 3 103-117 (1977) ("Johnson").

Sutton, Optimum Design of Ocean Bottom Seismometers, Marine Geophysical Researches 9 (1987), pp. 47-65 ("Sutton").

Schmalfeldt, Explosion-Generated Seismic Interface Waves in Shallow Water: Experimental Results, Saclantcen Report SR-71 (1983) ("Schmalfeldt").

Eguchi, A real-time observation network of ocean-bottom-seismometers deployed at the Sagami trough subduction zone, central Japan, Marine Geophysical Researches 20: 73-94, 1998 ("Eguchi").

Kirk, A Three-Component Ocean Bottom Seismograph for controlled Source and Earthquake Seismology, Marine Geophysical Researches 5, 1982, 327-341 ("Kirk").

(56) References Cited

OTHER PUBLICATIONS

Petition for Inter Partes Review of U.S. Pat. No. RE45,268, dated Apr. 27, 2018.
Petition for Inter Partes Review of U.S. Pat. No 8,879,362, dated Apr. 27, 2018.
Petition for Inter Partes Review of U.S. Pat. No. 8,228,761, dated Apr. 27, 2018.

\* cited by examiner

INDUCTIVE POWER FOR SEISMIC SENSOR NODE

The present application is a continuation of U.S. application Ser. No. 14/340,338, filed on Jul. 24, 2014, the entire contents of which is hereby incorporated herein by reference.

FIELD

This disclosure relates generally to seismic sensor nodes, and more specifically, to inductive power for seismic sensor nodes.

BACKGROUND

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs. Marine reflection seismology is based on using a controlled source of energy—typically acoustic energy—that sends the energy through subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits.

There are many methods to record the reflections from a seismic wave off the geological structures present in the surface beneath the seafloor. In one method, a marine vessel tows an array of seismic data recorders provided on streamers. In another method, seismic data recorders are placed directly on the ocean bottom by a variety of mechanisms, including by the use of one or more of Autonomous Underwater Vehicles (AUVs), Remotely Operated Vehicles (ROVs), or by dropping or diving from a surface or subsurface vessel. In either method, the data recorders can be discrete, autonomous units (no direct connection to other nodes or to the marine vessel) where data is stored and recorded or integrally linked (via communications and/or power) via wire or wireless links (such as acoustic, electromagnetic, or optical links).

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time, which may last up to 6 months or longer. Once the data recorders are retrieved, the data is downloaded and batteries may be replaced or recharged in preparation of the next deployment.

The ocean bottom node is typically self-sealing and leak proof and is safeguarded against temperature and pressure variations present at the bottom of the ocean. The typical battery used in such nodes is contained within the node's housing, and the housing or case of the node must be removed or opened to retrieve the battery after the node has been retrieved and brought to the ocean surface. Whether the battery is rechargeable or replaceable, the battery is connected via direct electrical or wire connections to other components of the node.

There are several problems with current battery configurations for seismic nodes. For example, common batteries in a seismic node generally involve conductor contacts between the battery and the node electronics. The conductor contacts may become corroded or worn through repeated removal and replacement of batteries and in response to moisture leakage. If the batteries are rechargeable, charging typically requires a wired charge connection, which means that the nodes cannot be deployed for up to several hours while the batteries are charged. Also, typical node configurations do not allow for simple automation of the recharging process. When several nodes are recharged simultaneously, it may require a complex system of wires for connecting the nodes, etc. One of ordinary skill will recognize several additional problems with common battery configurations in seismic nodes.

SUMMARY

Embodiments of systems and methods for inductively powering seismic sensor nodes are presented. An embodiment of an inductive battery includes a battery cell configured to store charge for use by an external device. The inductive battery may also include a first inductive element coupled to the battery cell, the first inductive element configured to receive current from the battery cell and emit a responsive magnetic field for powering an external device through inductance. In an embodiment the external device is a seismic sensor node.

The inductive battery may include a charge circuit for inductively charging the battery cell. In an embodiment, the charge circuit further comprises a second inductive element configured to generate current for charging the battery cells through inductance with a charging station. The inductive battery may also include a power controller coupled to the second inductive element and configured to control power supplied for charging the battery cell.

In an embodiment, the inductive battery may include a signal modulator configured to communicate a data signal via the first inductive element to the external device. Additionally, the inductive battery may include a signal demodulator configured to receive a data signal via the first inductive element from the external device. Also, the inductive battery may include a data storage device configured to store data received via the first inductive element.

An embodiment of a seismic node may include on-board electronics for seismic sensing. Additionally, the seismic node may include an on-board inductive element for generating an electrical current through inductance with an inductive battery device. In an embodiment, the seismic node may include a detachable inductive battery device coupled to the seismic sensor node, the detachable inductive battery device that includes a battery cell configured to store charge for use by the seismic sensor node, and a first inductive element coupled to the battery cell, the first inductive element configured to receive current from the battery cell and emit a responsive magnetic field for powering the seismic sensor node through inductance.

In an embodiment, the seismic node may include a power controller coupled to the on-board inductive element and configured to control power supplied for the on-board electronics. The seismic node may also include a signal modulator configured to communicate a data signal via the on-board inductive element to the detachable inductive battery device, and a signal demodulator configured to receive a data signal via the on-board inductive element from the detachable inductive battery device.

An inductive powering system is also presented. In an embodiment, the inductive powering system includes a first device, at least one inductive battery coupled to the first device, wherein the inductive battery is configured to power the first device through induction, and a charging station, wherein the inductive battery is configured for being inductively charged from the charging station. The first device may be a seismic sensor node in one embodiment.

In an embodiment, the seismic sensor node includes a receptacle configured to receive the inductive battery. The first device may include an on-board inductive element for generating an electrical current through inductance with the inductive battery device.

The inductive battery may include at least one battery cell configured to store charge for use by the seismic sensor node, and a first inductive element, the first inductive element being coupled to the at least one battery cell, the first inductive element configured to receive current from the at least one battery cell and emit a responsive magnetic field for powering the seismic sensor node through inductance. The inductive batteries may further include a charge circuit for inductively charging the battery cell. Additionally, the inductive batteries may include a second inductive element configured to generate current for charging the battery cells through inductance with a charging station. The inductive batteries may also include a power controller coupled to the second inductive element and configured to control power supplied for charging the battery cell.

In an embodiment, the inductive batteries may include a signal modulator configured to communicate a data signal via the first inductive element to the external device. The inductive batteries may also include a signal demodulator configured to receive a data signal via the first inductive element from the external device. In a further embodiment, the inductive batteries may include a data storage device configured to store data received via the first inductive element.

In an embodiment, the charging station is a base station. The charging station may be on marine vessel, subsea, or land-based base stations.

A method for charging an inductive battery for use with an external device is also described. In an embodiment, the method includes placing an inductive element of the inductive battery proximal to an inductive element of an external device. The method may also include generating a current through the inductive element of the inductive battery for powering the external device through inductance with the inductive element of the external device. In an embodiment, the external device is a seismic sensor node.

The method may also include communicating a signal between the inductive element of the external device and the inductive element of the inductive battery. In such an embodiment, the signal is configured to cause the inductive battery to turn off power to the seismic sensor node. The signal may also comprise configuration data for communication from the inductive battery to the seismic sensor node.

DETAILED DESCRIPTION

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the nonlimiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The present embodiments include systems, methods, and apparatuses for inductively powering a seismic sensor node. One of ordinary skill will recognize that the described embodiments may be expanded for use in inductively powering various alternative electronic devices and systems. Although the present embodiments are described in the context of embodiments of a seismic sensor node, the present embodiments are not intended to be limited solely for use with seismic sensor nodes, nor are the embodiments intended to be limited to subsea applications.

The present embodiments generally describe a marine-deployable seismic sensor node that is configured to receive power inductively from an inductive power supply. In an embodiment, the inductive power supply is an inductive battery which is configured to couple to the seismic sensor node and provide power via inductance between a paired set of inductive elements—one on the inductive battery, and one on the seismic node—without the need for physical electrical contacts between the seismic sensor node and the inductive battery. In an embodiment, the inductive battery may be disposed in a sealed housing, container, or package that is watertight and pressure tight. Beneficially, such an embodiment may be resistant to extreme moisture and pressure conditions experienced by seismic sensor nodes in a marine environment. Additionally, the inductive battery may be quickly connected and disconnected from the seismic node. The present embodiments avoid reliability problems associated with external electrical wiring or physical electrical contacts, such as corrosion, shorts, and wear. Recharge may be simplified, and inductive batteries may be quickly swapped allowing for rapid redeployment of the seismic sensor node. A further benefit is that the housing of the seismic sensor node does not need to be opened to replace or charge batteries, thereby reducing time required to change batteries and avoiding damage from water, contaminants, etc.

Figure 1A:
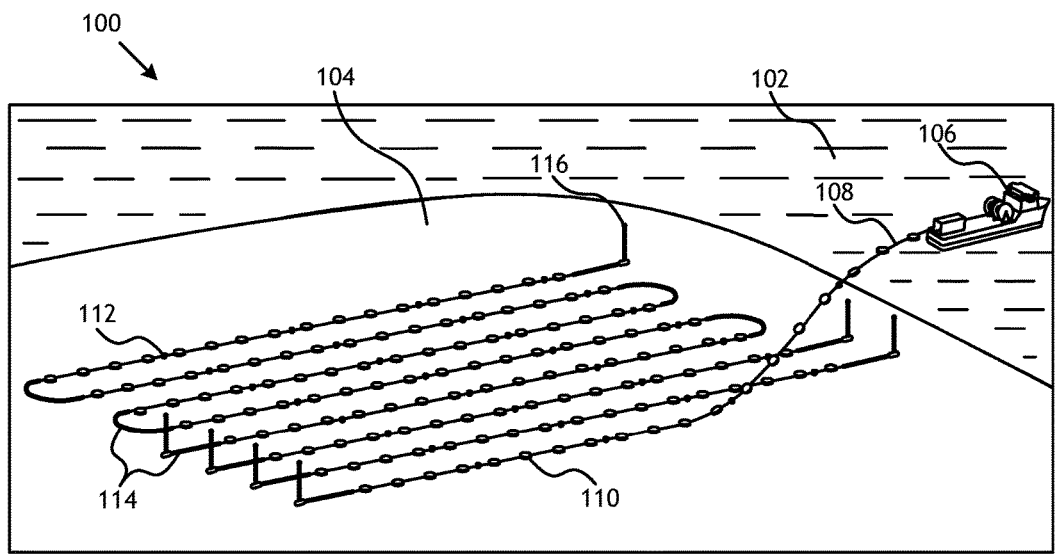
FIG. 1A is a schematic diagram illustrating one embodiment of a system for marine deployment of an inductively powered seismic sensor node.

FIG. 1A is a diagram illustrating one embodiment of a marine deployment system 100 for marine deployment of inductively powered seismic sensor nodes 110. One or more marine vessels 106 deploy and recover a deployment line 108, such as a cable or rope, with attached sensor nodes 110 according to a particular survey pattern. In an embodiment, the system 100 includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108. One or more seismic nodes 110 may be attached directly to the deployment line 108. Additionally, the marine deployment system 100 may include one or more acoustic positioning transponders 112, one or more weights 114, and one or more pop up buoys 116. As is standard in the art, weights 114 can be used at various positions of the cable to facilitate the lowering and positioning of the cable, and fixed buoys or subsurface releasable buoys 116 may be used on the cable to locate, retrieve, and/or raise various portions of the cable. Acoustic positioning transponders 112 may also be used selectively on various portions of the cable to determine the positions of the cable/sensors during deployment and post deployment.

Figure 1B:
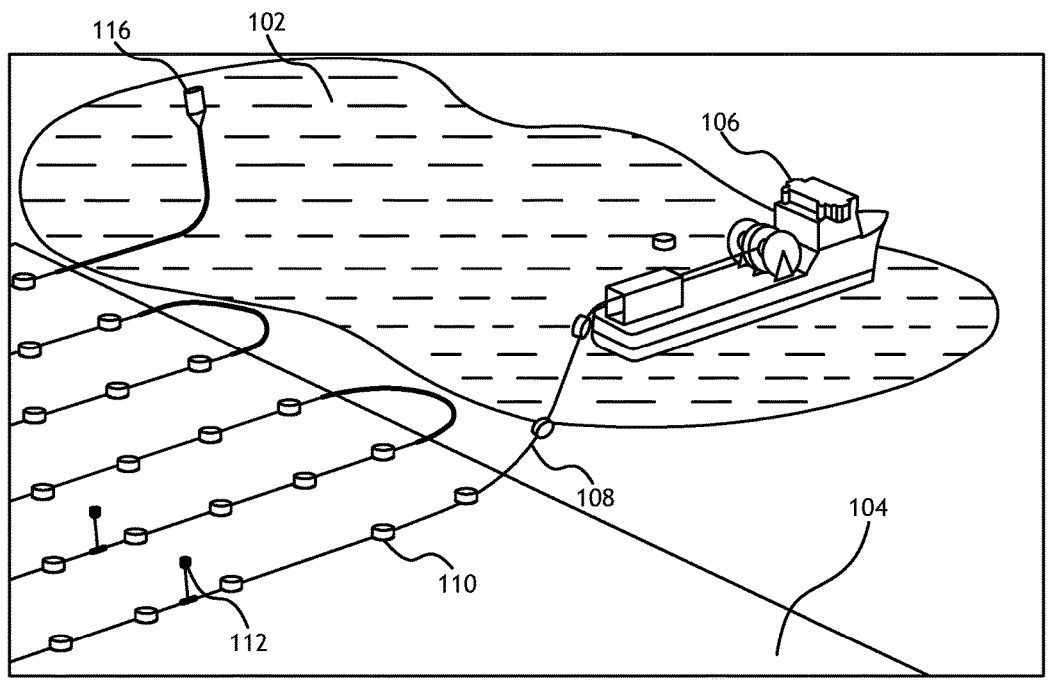
FIG. 1B is a schematic diagram illustrating one embodiment of a system for marine deployment of an inductively powered seismic sensor node.

FIG. 1B is a close-up view illustrating one embodiment of a system 100 for marine deployment of seismic nodes 110. In an embodiment, the deployment line 108 may be a metal cable (steel, galvanized steel, or stainless steel). Alternatively, the deployment line 108 may include chain linkage, rope (polymer), wire, or any other suitable material for tethering to the marine vessel 106 and deploying one or more seismic nodes 110. In an embodiment, the deployment line 108 and the seismic nodes 110 may be stored on the marine vessel 106. For example, the deployment line may be stored on a spool or reel. The seismic nodes 110 may be stored in a storage container, in one embodiment. One of ordinary skill may recognize alternative methods for storing and deploying the deployment line 108 and the seismic nodes 110.

In one embodiment, the deployment line 108 and seismic nodes 110 are stored on marine vessel 106 and deployed from a back deck of the vessel 106, although other deployment locations from the vessel can be used. As is well known in the art, a deployment line 108, such as a rope or cable, with a weight attached to its free end is dropped from the back deck of the vessel. The seismic nodes 110 are preferably directly attached in-line to the deployment line 108 at a regular interval (such as 25 meters) while the deployment line 108 is lowered through the water column and draped linearly onto the seabed. During recovery each seismic node 110 may be clipped off the deployment line 108 as it reaches deck level of the vessel 106. Preferably, nodes 110 are clipped directly onto the deployment line 108 in an automated process using node attachment or coupling machines on board the deck of the marine vessel 106 at one or more workstations or containers (not shown). Likewise, the coupling machine may be configured to decouple or otherwise disengage the deployment line 108 from the seismic node 110, and in some instances may use a detachment tool for such detaching. Alternatively, the seismic nodes 110 can be attached via manual or semi-automatic methods. The seismic nodes 110 can be attached to the deployment line 108 in a variety of configurations, which allows for proper rotation of the seismic node 110 about the deployment line 108 and allows for minimal axial movement on the deployment line 108. For example, the deployment line 108 can be attached to the top, side, or center of a seismic node 110 via a variety of configurations.

The acoustic positioning transponders 112 may transmit an acoustic signal to the marine vessel for indicating the positioning of the seismic nodes 110 on the sea floor 104. In an embodiment, the weights 114 may be coupled to the deployment line 108 and be arranged to keep the seismic nodes 110 in a specific position relative to the sea floor 104. Once the deployment line 108 and the seismic nodes 110 are deployed on the sea floor 104, a seismic survey can be performed. One or more marine vessels 106 may contain a seismic energy source (not shown) and transmit acoustic signals to the sea floor 104 for data recovery by the seismic nodes 110. Embodiments of the system 100 may be deployed in both coastal and offshore waters in various depths of water. For example, the system may be deployed in a few meters of water or in up to several thousand meters of water. In some embodiments, the depth may be between twenty (20) meters and five hundred (500) meters.

The pop up buoy 116 may be retrieved by the marine vessel 106 when the seismic nodes 110 are to be retrieved from the sea floor 104. Thus, the systems 110 of FIGS. 1A-B may not require retrieval by means of a submersible or diver. Rather, the buoy 116 may be picked up on the surface 102 and the deployment line 108 may be retrieved along with the seismic nodes 110.

Figure 2:
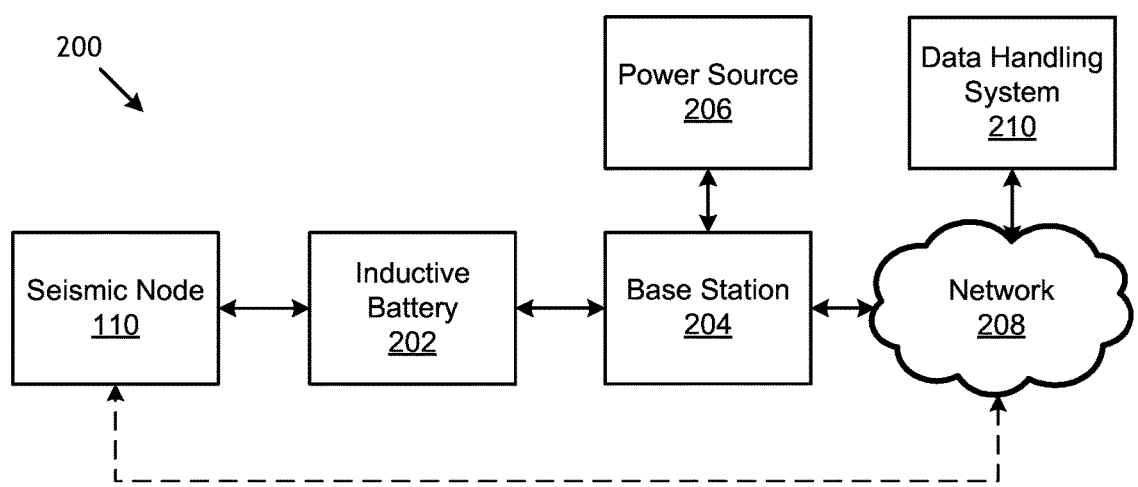
FIG. 2 is a schematic block diagram illustrating another embodiment of a system for inductively powering a seismic sensor node.

FIG. 2 is a schematic block diagram illustrating an embodiment of a system 200 for inductively powering a seismic sensor node. In an embodiment, the system 200 may be a ship-board system for use in with deployable seismic nodes 110 from a marine vessel 106. In an embodiment, the system 200 may include a seismic node 110. The system may include one or more inductive batteries 202 configured to supply power inductively to the seismic node 110. The system 200 may additionally include a base station 204 for storing and/or charging the inductive battery 202. The base station 204 may be coupled to a power source 206, such as the ship's electrical power system, a generator, a battery bank, a solar power system, a wind turbine power system, etc. In an embodiment, the base station 204 may additionally be coupled to a data communication network 208, such as an Internet Protocol (IP) network. A data handling system 210 may also be coupled to the network 208, and may be configured to communicate data with the seismic node 110.

In an embodiment, the seismic node 110 may include one or more electrical components, such as sensors. For example, a particular embodiment may include a hydrophone, one or more (preferably three) geophones, and a data recorder. In an embodiment, the data recorder may be a digital autonomous recorder configured to store digital data generated by the sensors or data receivers, such as hydrophone and the one or more geophones. One of ordinary skill will recognize that more or fewer components may be included in the seismic node 110. For example, there are a variety of sensors that can be incorporated into the node including and not exclusively, inclinometers, rotation sensors, accelerometers, and magnetometers. As another example, the hydrophone or the geophones may be omitted. In another embodiment, additional electrical components, such as an Analog to Digital Converter (ADC), or network interface components may be included. Further embodiments of a seismic node 110 are described with relation to FIG. 5 below.

In one embodiment, the base station 204 may receive power from the power source 206. The base station 204 may receive Alternating Current (AC) power in some embodiments. Alternatively, the base station 204 may receive Direct Current (DC) power from the power source 206, depending upon the configuration of a power system on board the vessel 106. As described below with reference to FIG. 8, the base station 204 may convert the power received from the power source 206 into power suitable for supplying to the inductive battery. In an embodiment, the base station 204 may inductively charge the inductive battery 202 via inductance between an inductive element in the base station 204 and an inductive element in the inductive battery. Alternatively, the base station 204 may charge the inductive battery via a wired or physical contact connection. While a preferred location of the base station 204 is on a marine vessel, other locations are also preferred, such as on an ROV, AUV, or subsea platform or container.

In a further embodiment, the data handling system 210 may communicate node configuration data to the seismic node 110 via a direct connection to the network 208, a wireless data connection, etc. In an alternative embodiment, the data handling system 210 may communicate node configuration data to the seismic node 110 via the inductive battery 202. For example, the data handling system 210 may communicate the node configuration data to the base station 204 via the network 208. The base station 204 may then upload the node configuration data to the inductive battery 202. The inductive battery 202 may then communicate the node configuration data to the seismic node 110 when inserted. One of ordinary skill will recognize that the seismic node 110 may also communicate data back to the data handling system 210 via various reverse processes. In a further embodiment, the data may be communicated between the inductive battery 202 and the seismic node 110 via respective inductive elements as described below with relation to FIGS. 5-7.

Figure 3A:
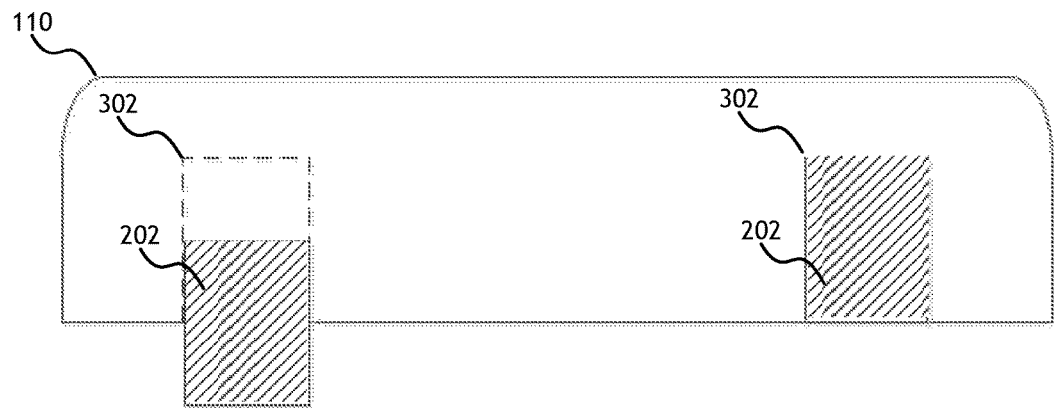
FIG. 3A is a cross-sectional view diagram illustrating one embodiment of system for inductively powering a seismic sensor node.

FIG. 3A is a cross-sectional view diagram illustrating one embodiment of system for inductively powering a seismic sensor node 110. In the embodiment of FIG. 3A, the seismic node 110 may include one or more receivers 302, each configured to receive an inductive battery 202. The receivers 302 may be configured as a slot, a hole, a depression, a receptacle, or the like. The receiver 302 may be configured to receive and retain the inductive battery 202 in a position suitable for inductive transmission of power between the inductive battery 202 and the seismic node 110. In various embodiments, the inductive batteries 202 may be removable, replaceable, interchangeable, etc. One of ordinary skill in the art will recognize that the inductive battery 202 can be removed and/or inserted into receptacles by a variety of methods, such as by manual means (such as by a technician), semi-manual means (such as a ROV), or by automatic means (such as by an inductive battery coupling machine). Likewise, because the inductive battery 202 is a self-contained unit with no exposed electronics, one of ordinary skill in the art will recognize that the inductive battery can be removed and/or inserted into receptacles of the seismic sensor node 110 while the node is still deployed subsea or in other sensitive operating conditions or environments.

Figure 3B:
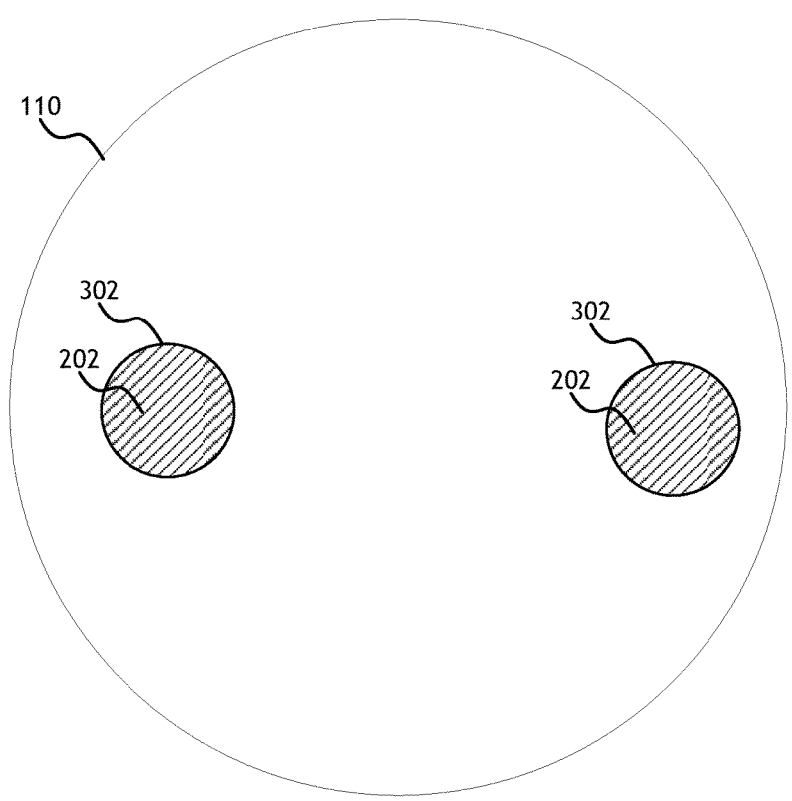
FIG. 3B is an end-view diagram illustrating one embodiment of system for inductively powering a seismic sensor node.
Figure 4:
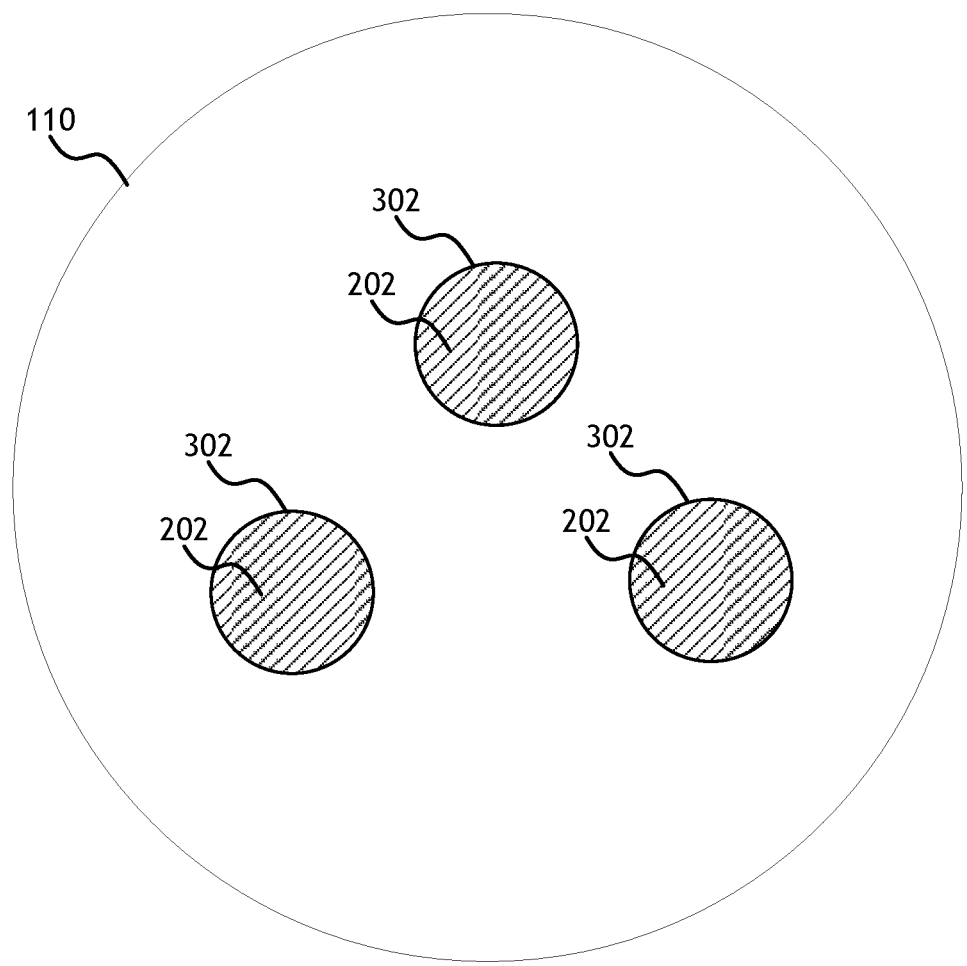
FIG. 4 is an end-view diagram illustrating one embodiment of system for inductively powering a seismic sensor node.

FIG. 3B is an end-view diagram of the system described in FIG. 3A. In an embodiment, the inductive batteries 202 may have a circular cross-section. In other embodiments, the inductive batteries 202 may have square, rectangular, or other shaped cross-sections, depending on the design requirements of the seismic node 110 and the battery configuration. In various embodiments the receiver 302 may be shaped to physically receive the inductive battery 202. FIG. 4 is an end-view diagram illustrating another embodiment of a system for inductively powering a seismic sensor node 110. In the embodiment of FIG. 4, three inductive batteries 202 are included. One of ordinary skill will recognize that more or fewer inductive batteries may be used according to the present embodiments.

Figure 5:
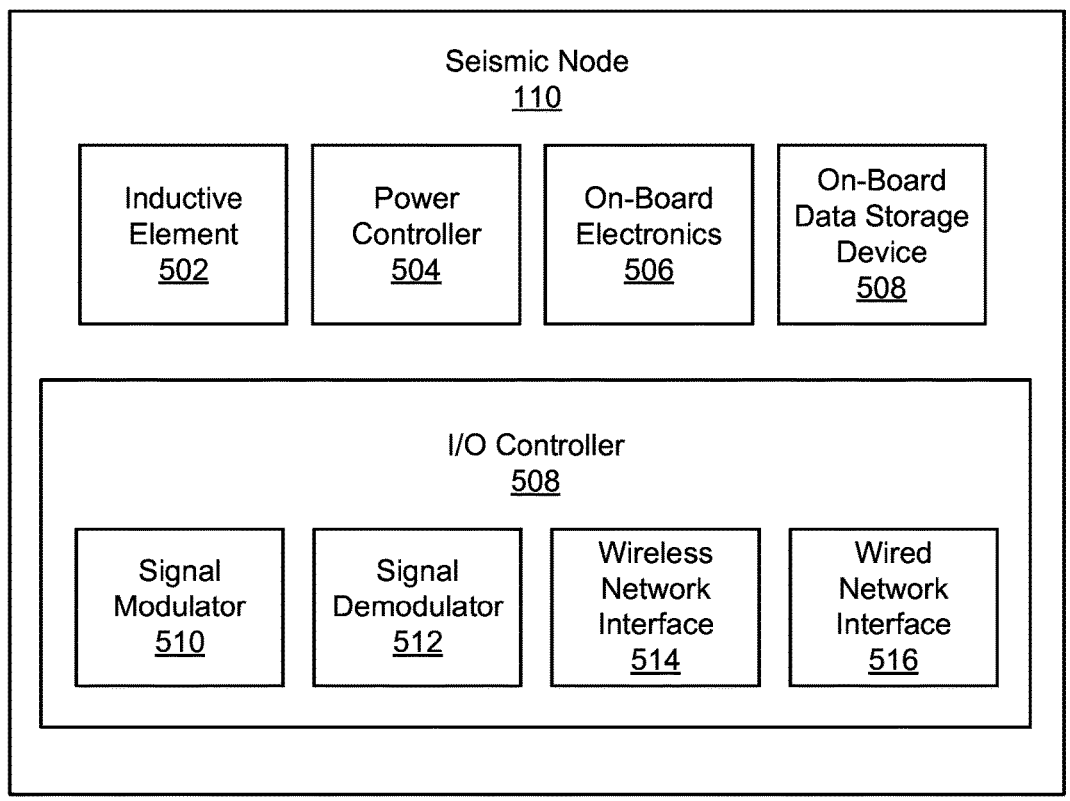
FIG. 5 is a schematic block diagram illustrating one embodiment of a seismic sensor node configured to be inductively powered by a battery.

FIG. 5 is a schematic block diagram illustrating one embodiment of a seismic sensor node 110 configured to be inductively powered by an inductive battery 202. In an embodiment, the seismic node 110 may be structurally configured similarly to the embodiments of FIGS. 3A-B or FIG. 4. Internally, the seismic node 110 may include on-board electronics 506, including sensors as described above with relation to FIG. 2. In particular, the on-board electronics 506 may include a hydrophone, one or more geophones, and a data recorder. In some embodiments, the on-board electronics 506 may include a microcontroller, or other data processor configured to handle data generated by the sensors. In still a further embodiment, the data generated by the sensors may be stored in an on-board data storage device 508. The on-board electronics 506 may be configured to operate at a predetermined DC voltage level supplied by the inductive battery 202. One of ordinary skill will recognize various suitable DC voltage levels for operation of the on-board electronics 506, such as 1.8 V, 3 V, 5 V, etc.

In an embodiment, the seismic node 110 may include an inductive element 502 configured to pair with an inductive element of the inductive battery 202 to receive power via inductance. The inductive element 502 may be a coil in one embodiment. In other embodiments, the inductive element 502 may be an inductive patch antenna, such as a patterned microstrip line, or the like. One of ordinary skill will recognize various inductive elements 502 which may be suitably configured for use with the present embodiments.

In one embodiment, the seismic node 110 may also include a power controller 504 configured to convert and/or regulate the power received by the inductive element 502 for use by the on-board electronics 506. For example, the power controller 504 may include a step-up or step-down power converter, an AC to DC converter, an isolation circuit or Electromagnetic Field (EMF) protection circuit for preventing power surges from the inductive element 502, etc. In a further embodiment, the power controller 504 may also include matching circuitry for matching an impedance of the inductive element 502.

In addition, the seismic node 110 may include an Input/Output (I/O) controller 508. In various embodiments, portions of the I/O controller 508 may be integrated with the on-board electronics 506. The I/O controller 508 may include a signal modulator 510, a signal demodulator 512, a wireless network interface 514, and/or a wired network interface 516. In an embodiment, the signal modulator 510 and/or the signal demodulator 512 may be configured to communicate data to and from the on-board storage device 508 via the inductive element 502 to the inductive battery 202. In other embodiments, the signal modulator 510 and the signal demodulator 512 may be configured to communicate data directly between the on-board electronics 506 and the inductive battery 202, without the need for an on-board data storage device 508. In an alternative embodiment, the data may be communicated externally via a wireless network interface 514 configured to communicate via a Wi-Fi network, a WiMAX network, a mobile or cellular data network, or the like. In still another embodiment, the I/O controller 508 may include a wired network interface for direct communication of data to an external component, such as the base station 204.

Figure 6:
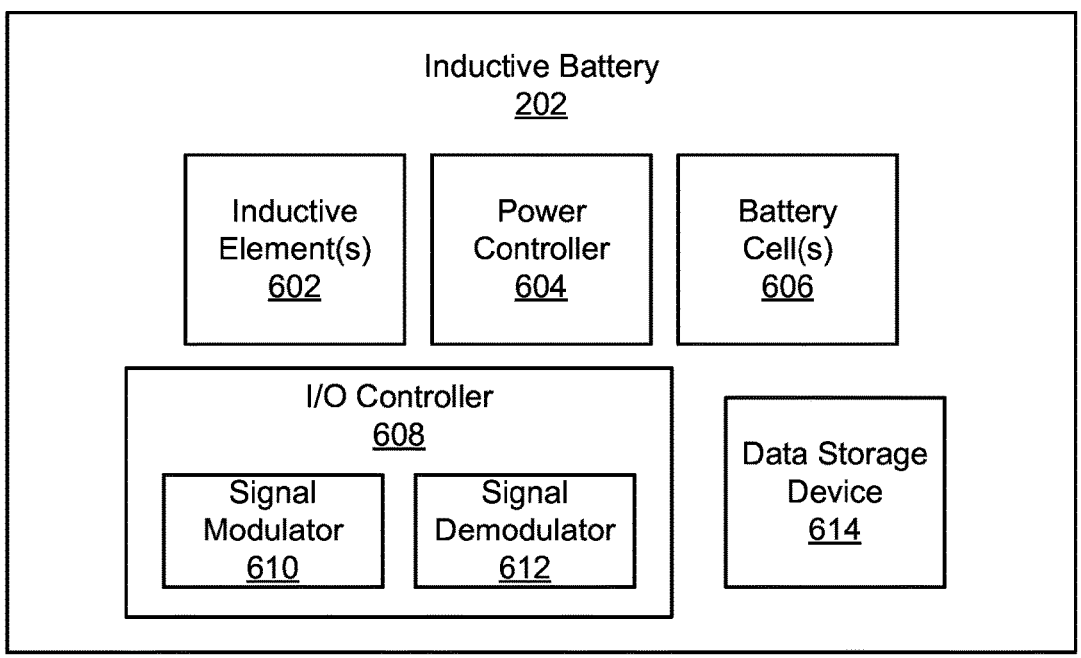
FIG. 6 is a schematic block diagram illustrating one embodiment of a battery for inductively powering a seismic sensor node.

FIG. 6 is a schematic block diagram illustrating one embodiment of an inductive battery 202. In an embodiment, the inductive battery 202 may include one or more inductive elements 602, a power controller 604, and one or more battery cells 606. In a further embodiment, the inductive battery 202 may include an I/O controller 608. The I/O controller 608 may include a signal modulator 610 and/or a signal demodulator 612 for communicating data signals over one or more of the inductive elements 602. In still a further embodiment, the inductive battery 202 may include an internal data storage device 614 for storing data received via the signal demodulator 612.

The inductive element(s) 602 may include wire loops, coils, windings, etc. In an alternative embodiment, the inductive element(s) 602 may include printed inductor elements, such as a patch antenna, microstrip line, etc. The inductive element(s) 602 may be configured to maximize inductance between the inductive element(s) 602 of the inductive battery and the corresponding inductive element 502 of the seismic node 110, and/or the base station 204.

In an embodiment, the battery cell(s) 606 may be rechargeable. For example, the battery cell(s) 606 may include a lithium-ion battery cell. In one embodiment, the battery cell(s) 606 include a plurality of lithium-ion windings. In another embodiment, the battery cell 606 may include a lithium-ion electrode stack. The shape and size of the battery cell(s) 606 may be configured according to the power, weight, and size requirements of the seismic sensor node 110. One of ordinary skill will recognize a variety of battery cell types and configurations that may be suitable for use with the present embodiments.

In an embodiment, the seismic node 110 may communicate data to the inductive battery 202 over one or more of the inductive elements. In such an embodiment, the inductive battery 202 may store the data received from the seismic node 110 in an internal data storage device 614. In one embodiment the internal data storage device 614 may be a non-volatile memory, such as a flash memory device. In such an embodiment, the I/O controller 608 may receive signals over the inductive element(s) 602 and demodulate the signals with the signal demodulator 612. The demodulated signals may then be stored until the inductive battery is placed on the base station 204.

In an embodiment, the inductive battery 202 may be removed from the seismic node 110 before being placed on the base station 204. In certain embodiments, the inductive battery 202 may communicate the data stored in the data storage device 614 during operation of the seismic node 110 to the base station 204 via the signal modulator 610 and one or more inductive elements 602. For example, the base station 204 may charge the inductive battery cell(s) 606 and receive data signals via the same inductive element 602. In another embodiment, the base station 204 may communicate data from the data handling system 210 to the inductive battery 210. In still a further embodiment, the base station 204 may charge the inductive battery 202 and communicate data with the inductive battery simultaneously.

Figure 7:
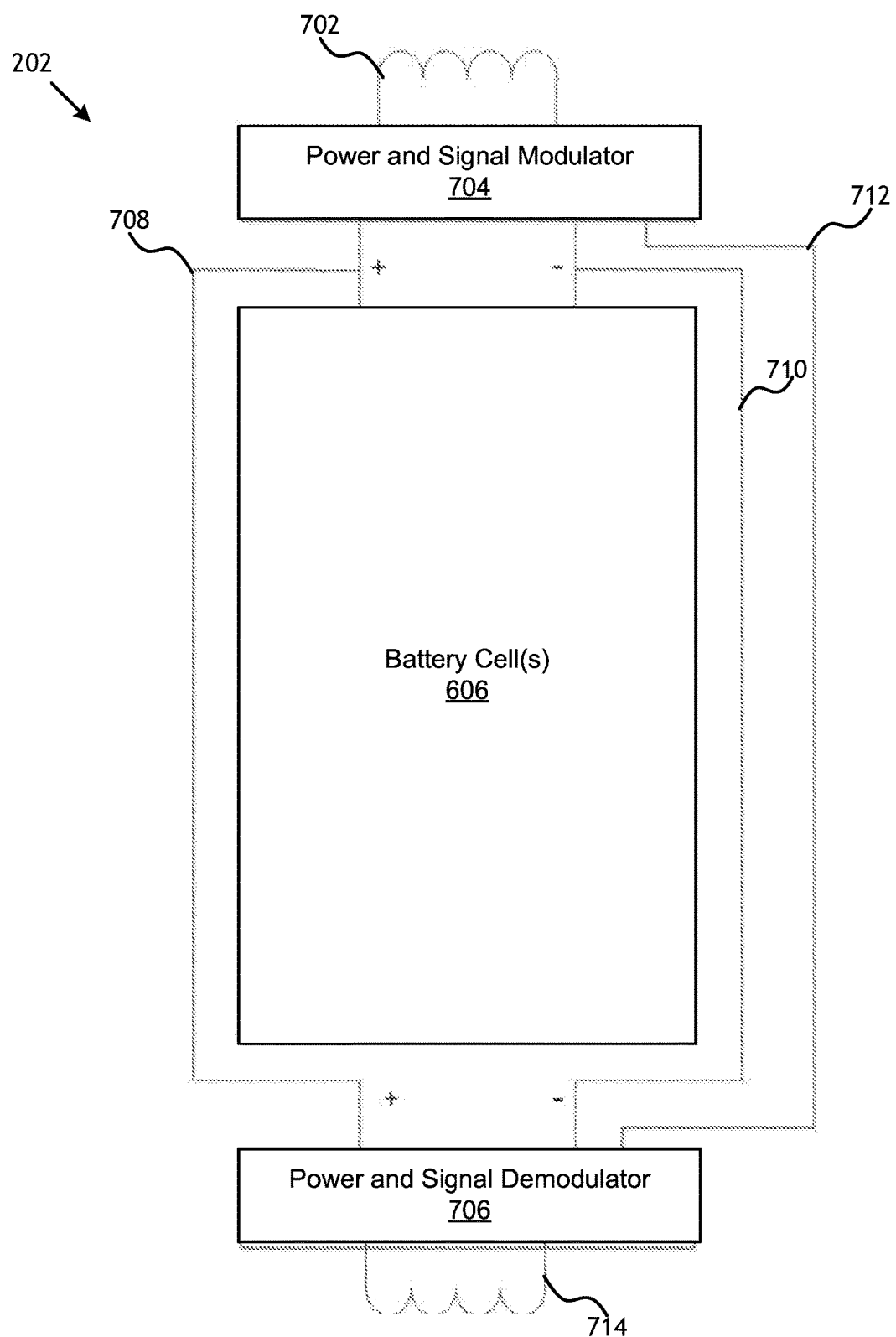
FIG. 7 is a schematic block diagram illustrating another embodiment of a battery for inductively powering a seismic sensor node.

FIG. 7 is a schematic block diagram illustrating another embodiment of an inductive battery 202. In the depicted embodiment, the inductive battery 202 includes a first inductive coil 702 configured to provide power and data from the inductive battery 202 to the seismic node 110. The first inductive coil 202 may be coupled to a power and signal modulator block 704, which is configured to manage power supplied by the battery cell(s) 606 to the first inductive coil 702. The power and signal modulator block 704 may additionally modulate data signals for transfer to the seismic node 110 via the inductive battery 202.

The inductive battery 202 of FIG. 7 may additionally include a second inductive coil 714 and a power and signal demodulator block 706. The second inductive coil 714 may be configured to generate current for charging the battery cell(s) 606 through mutual magnetic inductance with a charging coil in the base station 204. Additionally, the power and signal modulator block 706 may be configured to demodulate a data signal received from an external device, such as the base station 204, over the second inductive coil 714. The inductive battery 202 may include a positive power conductor 708 and a negative power conductor 710. The battery cell(s) 606 may be charged from the power and signal demodulator block 706 via the positive power conductor 708 and the negative power conductor 710. In another embodiment, the battery cell(s) 606 may provide power to the power and signal modulator block 704 via the positive power conductor 708 and the negative power conductor 710.

In a further embodiment, the power and signal modulator block 704 may be coupled to the power and signal demodulator block 706 via a signal line 712 for communication of data between the first inductive coil 702 and the second inductive coil 714. Thus, in one embodiment, data received by the power and signal demodulator block 706, from either the base station 204 or the seismic node 110 may be passed through to the power and signal modulator block 704 to either the base station 204 or the seismic node 110 respectively.

Figure 8:
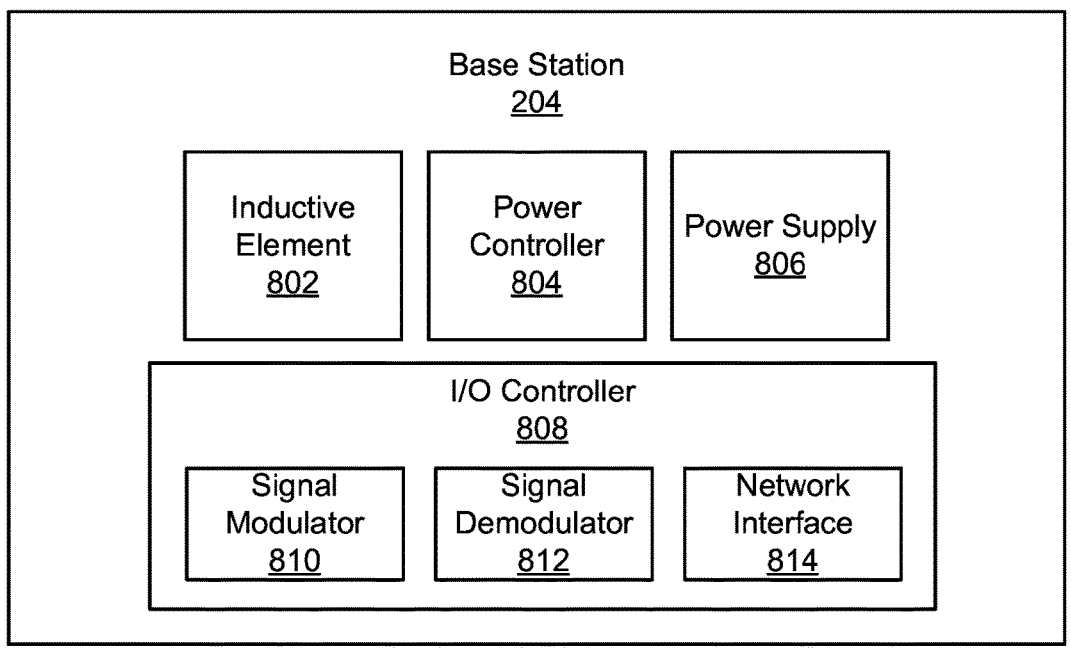
FIG. 8 is a schematic block diagram illustrating one embodiment of a base station for charging a battery for inductively powering a seismic sensor node.

FIG. 8 is a schematic block diagram illustrating one embodiment of a base station 204. In an embodiment, the base station 204 may be configured to charge the inductive battery 202. In a further embodiment, the base station 204 may be configured to simultaneously charge multiple inductive batteries 202. The base station 204 may also be configured to communicate data to the inductive battery 202 or to the seismic node 110 via the inductive battery 202. The base station 204 may include an inductive element 802, a power controller 804, and a power supply 806. In a further embodiment, base station 204 may include an I/O controller 808.

In an embodiment, the base station 204 may include a housing having a portion configured to receive one or more inductive batteries 202. The inductive element 802 may be a coil an inductive patch antenna, a microstrip line, etc. The inductive element 802 may be configured to generate a inductance current in a corresponding inductive element 602 in the inductive battery 202 for charging battery cell(s) 606 in the inductive battery 202. The power controller 804 may include circuitry for setting a charge current. In an embodiment, the charge current may be selectable via the power controller 804. The power controller 804 may be coupled to a power supply 806. For example, the power supply 806 may connect to a ship-board power system of a marine vessel 106. The power supply 806 may receive 110 V AC power. Alternatively, the power supply 806 may receive 12 V DC power. One of ordinary skill will recognize alternative power levels that may be provided to power supply 806.

In an embodiment, the I/O controller 808 may be configured to communicate data signals with the inductive battery 202. The I/O controller 808 may include a signal modulator 810 in one embodiment. The I/O controller 808 may also include a signal demodulator 812. In a further embodiment, the I/O controller 808 may include a network interface 814 for communicating data over the network 208. The signal modulator 810 may modulate data signals for communication to the inductive battery 202 over the inductive element 802. The signal demodulator 812 may demodulate a data signal received from the inductive battery 202 via the inductive element 802. Additionally, I/O controller 808 may include one or more filters, isolation circuits, etc. for differentiating power signals received or transmitted over the inductive element 802 from noise on the inductive element 802 generated by inductance power transfer.

Figure 9:
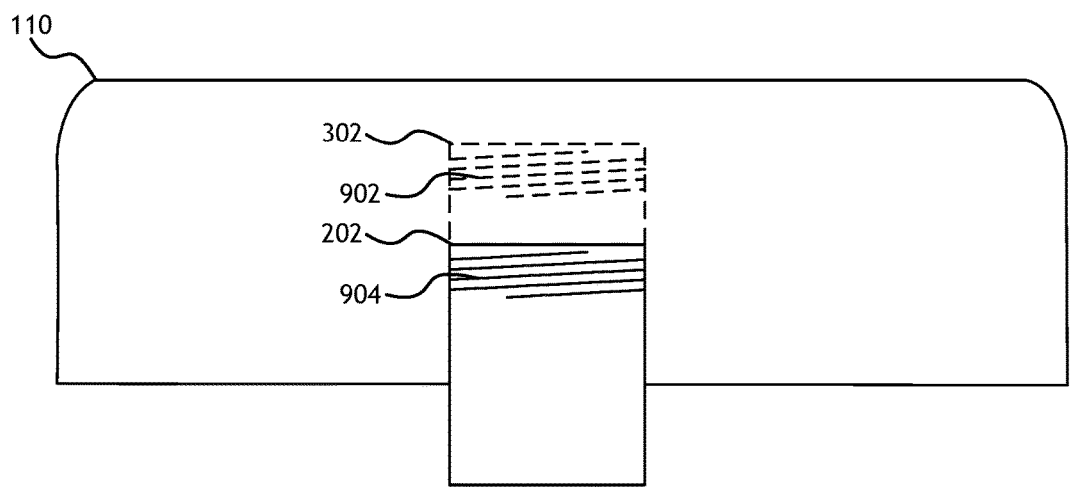
FIG. 9 is a schematic diagram illustrating an embodiment of an attachment mechanism for attaching an inductive battery to a seismic sensor node.

FIG. 9 is a schematic diagram illustrating an embodiment of an attachment mechanism for attaching an inductive battery 202 to a seismic sensor node 110. In an embodiment, the seismic node 110 may include a receiver 302 for receiving the inductive battery 202. In the embodiment illustrated in FIG. 9, the inductive battery 202 may include screw threads 904 on the housing of the inductive battery. The receiver 302 may include mating screw threads 902 for securing the inductive battery 202 within the receiver 302.

Figure 10:
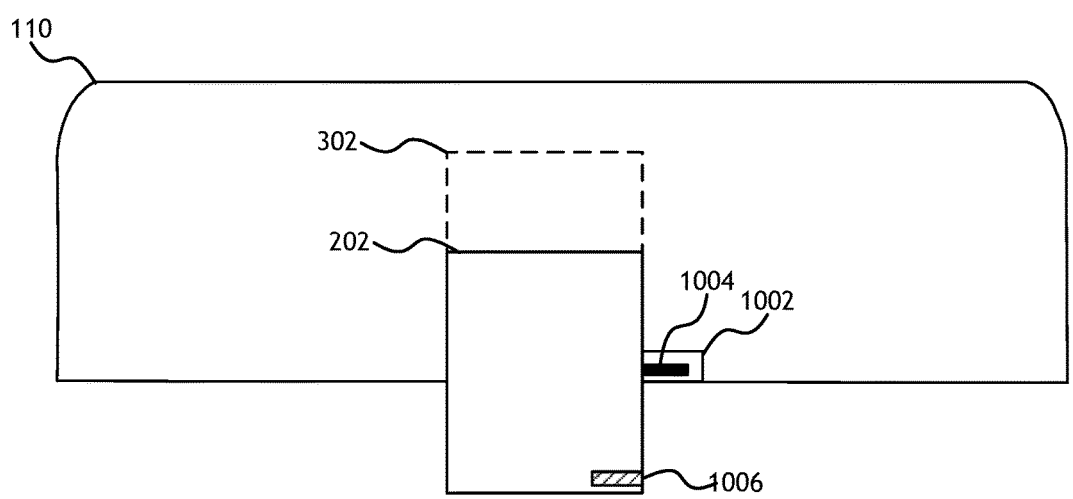
FIG. 10 is a schematic diagram illustrating an embodiment of an attachment mechanism for attaching an inductive battery to a seismic sensor node.

FIG. 10 is illustrates another embodiment of an attachment mechanism. In the depicted embodiment, the seismic node 110 includes a locking mechanism 1002 for locking the inductive battery 202 in the receiver 302. For example, the locking mechanism may include a retractable pin 1004. The retractable pin 1004 may be spring-loaded in some embodiments, and may insert into a pin receiver 1006 on the inductive battery 202 for securing the inductive battery 202. In further embodiments, the locking pin 1004 may be a detent ball or pin, a flange, or the like. One of ordinary skill will recognize a variety of attachment mechanism that may be suitable for use according to the present embodiments.

Figure 11:
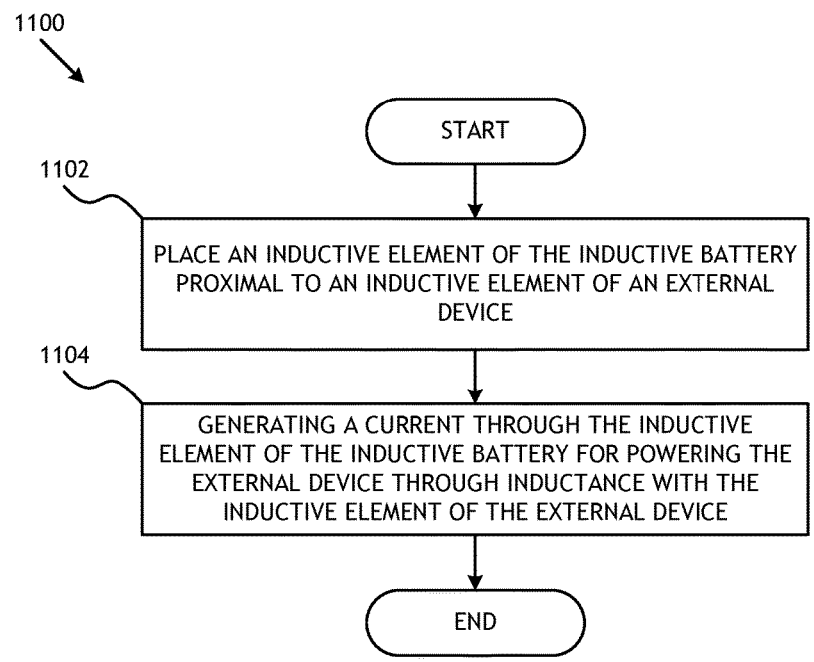
FIG. 11 is a flowchart diagram illustrating one embodiment of a method for inductively powering a seismic sensor node.

FIG. 11 is a flowchart diagram illustrating one embodiment of a method 1100 for inductively powering an external device with an inductive battery 202. In an embodiment, the method 1100 includes placing an inductive element of the inductive battery proximal to an inductive element of the external device, such as seismic node 110, as shown at block 1102. At block 1104, the method 1100 includes generating a current through the inductive element of the inductive battery for powering the external device through inductance with the inductive element of the external device.

Additionally, embodiment of the method 1100 may include placing an inductive element 602 of the inductive battery 202 proximal to an inductive element 802 of a charging station 204. The method 1100 may also include obtaining power from a power source for powering the charging station 204. Additionally, the method 1100 includes generating a current through the inductive element 802 of the charging station 204 sufficient to generate a magnetic field to cause the inductive element 602 of the inductive battery 202 to charge a battery cell 606 in the inductive battery 202 through mutual induction.

In further embodiments, the method 1100 may include communicating a signal over the inductive element 802 of the charging station 204 to the inductive battery 202. In such an embodiment, the signal may be configured to cause the inductive battery 202 to turn off power to the seismic sensor node 110. In another embodiment, the signal includes configuration data for communication from the inductive battery 202 to the seismic sensor node 110.

In one embodiment, the method 1100 may include detaching the inductive battery 202 from the seismic sensor node 110. Alternatively, the inductive battery 202 may remain attached to the seismic node 110. In a further embodiment, the method 1100 includes placing the inductive battery 202 in a receiver on the charging station 204, the receiver configured to position inductive element 602 of the inductive battery 202 relative to the inductive element 802 of the charging station 204.

In one embodiment, the method 1100 includes receiving a signal from the inductive battery 202 over the inductive element 802 of the charging station 204, the signal indicating that the inductive battery 202 is fully charged. In such an embodiment, the method may also include switching off current to the inductive element 802 of the charging station 204 in response to receiving the signal from inductive battery 202.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

In one embodiment, the inductive battery, and related apparatus and operations, described herein can be utilized in a variety of subsea applications not limited to a subsea node. For example, the inductive battery can be utilized in a variety of subsea operations and devices, such as oil and gas platforms and instrumentations, electronics, communications systems, and remote/autonomous vehicles. Likewise, the described inductive battery can be used in devices and systems that are intended for mobile, semi-permanent, or permanent installations. It should further be understood that the inductive battery, and related apparatus and operations, described herein can be utilized in a variety of applications, not limited to sea activities, where the device will be exposed to potentially harsh and/or sensitive pressure, temperature, and fluid conditions. For example, various embodiments of the inductive battery can be used in downhole equipment in the oil and gas industry, mobile communications devices, portable electronics, and other instrumentation. Likewise, the described base station can be utilized and located on a moving vessel (airplane, vehicle, boat) or at a non-moving permanent or semi-permanent housing or container on land.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A seismic node, comprising:
one or more electronic components;
an on-board inductive element coupled to the one or more electronic components; and
at least one inductive battery, wherein the inductive battery comprises one or more battery cells; and
a first inductive element coupled to the one or more battery cells and the on-board inductive element,
wherein the seismic node comprises a receptacle configured to receive the at least one inductive battery.

2. The node of claim 1, wherein the inductive battery comprises a charge circuit.

3. The node of claim 2, wherein the charge circuit comprises a second inductive element.

4. The node of claim 1, wherein the inductive battery is detachable from the seismic node.

5. The node of claim 1, wherein the at least one inductive battery comprises a plurality of inductive batteries, wherein the seismic node comprises a plurality of receptacles each configured to receive one of the plurality of inductive batteries.

6. The node of claim 1, wherein the inductive battery is configured to transmit data with the node over the first inductive element.

7. The node of claim 1, wherein the first inductive element is configured to provide power and data to the one or more electronic components.

8. The node of claim 1, wherein the inductive battery comprises a data storage device.

9. The node of claim 1, wherein the inductive battery comprises a second inductive element configured to exchange power and data with an external device.

10. The node of claim 1, wherein the inductive battery is contained within a sealed housing that is removable from the node.

11. The node of claim 1, wherein the inductive battery is configured to be charged subsea.

12. The node of claim 11, wherein the charging is conducted by an ROV or AUV.

13. A seismic node, comprising
a first housing comprising one or more electronic components, wherein the first housing comprises an on-board inductive element coupled to the one or more electronic components;
a second housing comprising at least one inductive battery, wherein the second housing is detachable from the first housing.

14. The node of claim 13, wherein the inductive battery comprises one or more battery cells and a first inductive element coupled to the one or more battery cells.

15. The node of claim 13, wherein the first housing comprises a receptacle configured to receive the second housing.

16. The node of claim 13, wherein the second housing is coupled to the first housing by a locking mechanism.

17. A method for powering a seismic node, comprising:
positioning an inductive battery with a first inductive element proximate to a seismic node;
generating a current through the first inductive element; and
powering the seismic node through the current generated through the first inductive element.

18. The method of claim 17, wherein the positioning step comprises placing the inductive battery within a receptacle of the seismic node.

19. The method of claim 17, further comprising replacing the inductive battery with a charged inductive battery at a subsea position.

20. The method of claim 17, further comprising charging the inductive battery at a subsea position by an ROV or AUV.

21. The method of claim 17, further comprising transmitting data between the inductive battery and the seismic node through the first inductive element.

22. The method of claim 17, further comprising generating a current in an on-board inductive element coupled to one or more electronic components of the seismic node by the current generated through the first inductive element.

* * * * *